Jan. 17, 1950  E. R. WADLEIGH  2,494,974
DIE FOR THERMOPLASTICS

Filed May 11, 1946  2 Sheets-Sheet 1

INVENTOR.
Elbert R. Wadleigh
BY Mason Graham
Attys

Jan. 17, 1950 E. R. WADLEIGH 2,494,974
DIE FOR THERMOPLASTICS
Filed May 11, 1946 2 Sheets-Sheet 2
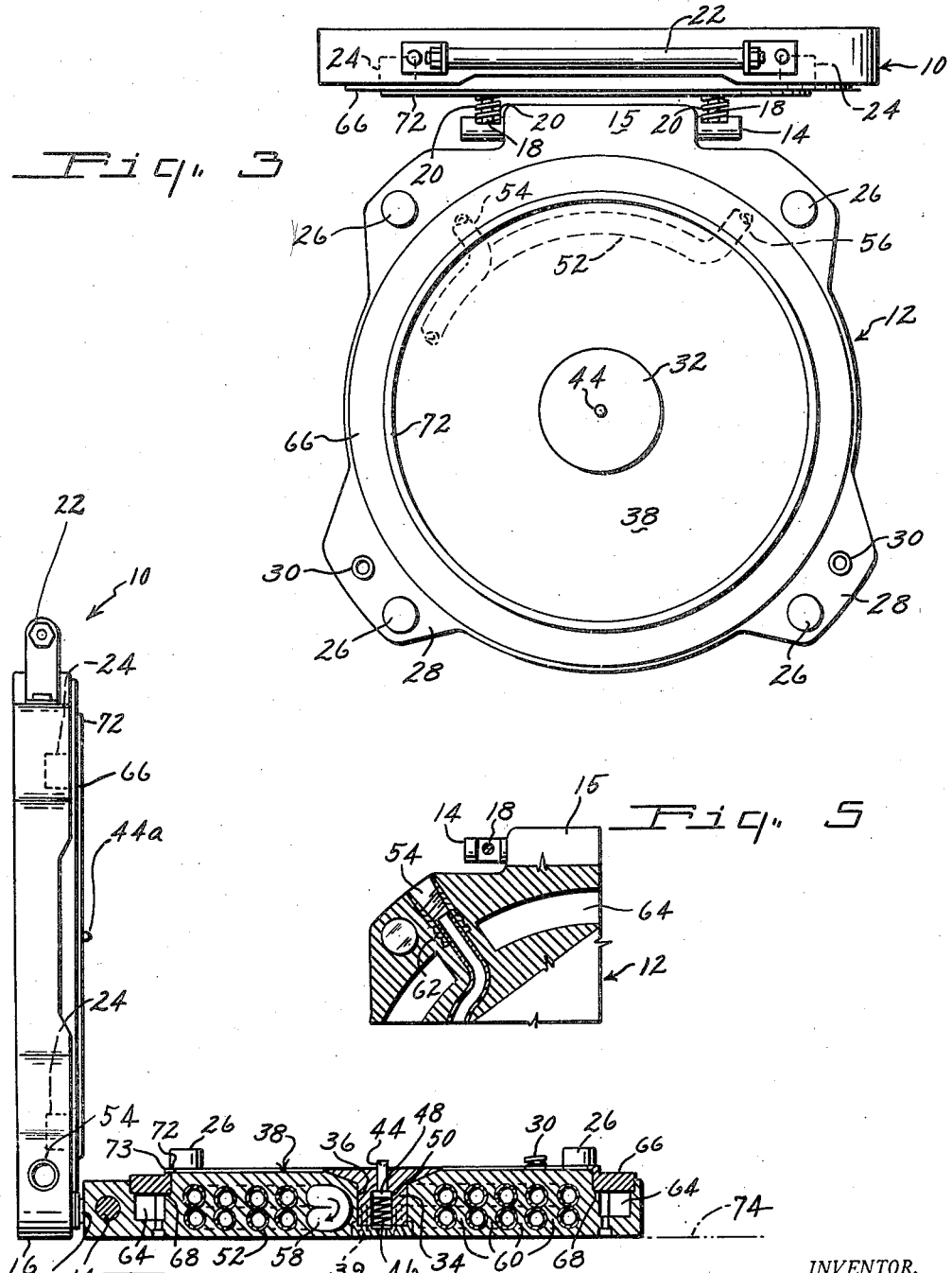
INVENTOR.
Elbert R. Wadleigh
BY Mason & Graham
Attys

Patented Jan. 17, 1950

2,494,974

UNITED STATES PATENT OFFICE 2,494,974

DIE FOR THERMOPLASTICS

Elbert R. Wadleigh, Los Angeles, Calif.

Application May 11, 1946, Serial No. 669,003

4 Claims. (Cl. 18—5.3)

This invention relates to dies designed for the production of articles molded from plastic materials, and particularly for producing phonograph records. The invention will be hereinafter described as embodied in a die for making double sided phonograph records by way of example only.

Dies for the manufacture of phonograph records are so arranged that the die or mold, with the plastic material enclosed therein, as a flat "biscuit" in soft condition, is subjected to a pressure of the order of twenty-five tons, the die being maintained at an elevated temperature for the length of time required to produce perfectly molded records, after which the heating medium is replaced by a cooling medium to set the material of the record and enable it to be removed from the mold or die without danger of being warped.

A similar procedure is required when molding plastic articles other than phonograph records in appropriately formed dies.

To meet production requirements it is important that the dies should be capable of producing maximum output of a satisfactory product at a relatively low cost of equipment since models, and particularly records, are continuously changed and a low sale price for such articles is often a controlling factor.

Phonograph records are one of the most exacting plastic products to manufacture since not only is the demand for a particular record sometimes very great for a comparatively short time, but very careful practice is required to produce a high quality of record, while the cost of the record should be kept low in order to supply the mass market.

It will be understood that the die of the invention is particularly intended to be placed on the platen of a press and connected to conduits supplying heating and cooling medium, the die being readily removable from the press to enable a "stamper" or matrix to be changed.

An object of the invention is to provide a die for molding articles from plastic materials which, while inexpensive to produce, is rugged and long wearing.

A further object of the invention is to provide a die for producing phonograph records which is easy to handle and readily positioned on the platen of a press, or removed therefrom.

A further object of the invention is to provide a die which is easy and simple to operate, enabling an operator to turn out a large volume of work.

Another object of the invention is to provide a die for producing phonograph records which is furnished with heating and cooling ducts cast in the die and arranged so as to secure controllable temperature across the whole surface of the die, the arrangement of the ducts being such that the strength of the die, to withstand the high pressures applied thereto, is maintained.

A further object of the invention is to provide a die for producing plastic articles and particularly phonograph records, which is arranged to preserve the desired temperature of the die face around the periphery thereof.

Another object is to provide a die in which only the necessary mass of metal is incorporated while at the same time the amount of machine work required to produce the die is reduced to a minimum.

Another object of the invention is to provide a die for producing phonograph records which is formed in two halves connected together to permit the die to be readily opened to position a biscuit of plastic material therein and to remove a molded record therefrom without upsetting the accurate alignment of the halves of the die.

Further objects and features of the invention will appear from the following description taken in conjunction with the accompanying drawings, in which:

Fig. 3 is a plan view of the die in open position;

Fig. 4 is a side elevation of the die in open position with the lower half of the die in section;

Fig. 5 is a fragmentary detail showing the arrangement of the cooling duct ends in the body of the die halves, a fragment of the lower die half being shown.

Figure 1:
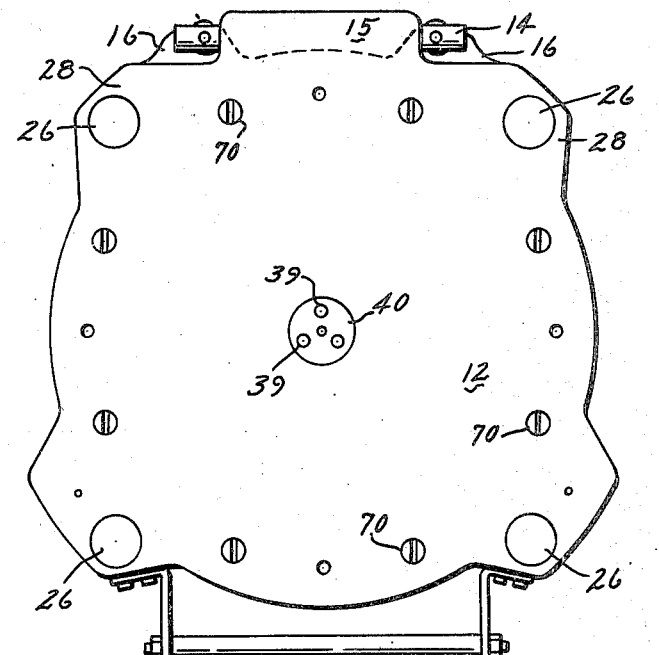
Fig. 1 is a bottom view of the die in closed position.
Figure 2:
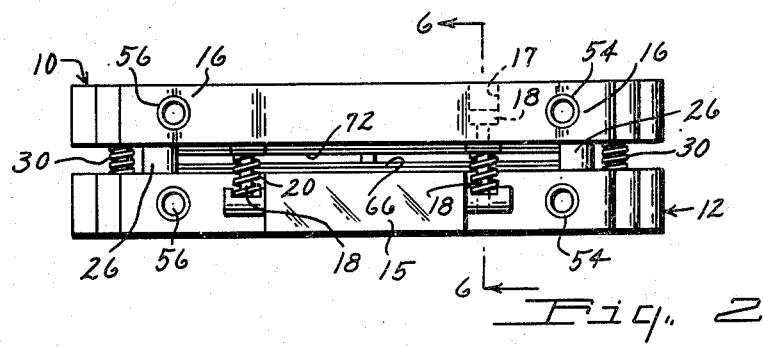
Fig. 2 is a side elevation of the die in closed position but without pressure applied thereto.
Figure 6:
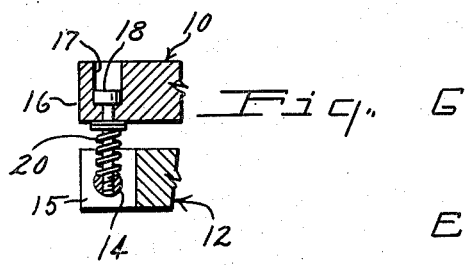
Fig. 6 is a fragmentary section showing the arrangement of the hinged connection of the upper and lower halves of the die.

The die of my invention is produced by casting the two parts of the die from a suitable metal such as "Kirksite," a well known metal alloy die material, thus reducing the amount of machine work to a minimum.

In the drawings, numeral 10 indicates the upper half and 12 the lower half of a die, the halves being hinged together. The hinge construction comprises a hinge bar 14 mounted to turn on its axis in a bore formed in a projecting part 15 at the back of the lower half of the die, the ends of the bar extending to each side of the projection. The upper half of the die is provided with projections 16 at its back extending over each end of the hinge bar 14 which are drilled and counterbored at 17 to receive headed studs 18 screwed into threaded bores in the hinge bar 14. Strong helical springs 20 are arranged around the stems of the studs between the upper and lower halves of the mold.

The front of the upper half of the die is provided with a handle 22 and is fitted with bushings 24 adapted to receive positioning studs 26 projecting upwardly from lateral projections 28 formed on the lower half of the die. The projections 28 carrying the studs at the front or side opposite the hinged side are also provided with stiff springs 30 mounted in, and projecting from, bores formed in the projections 28, the construction being such that when the die is closed, but before pressure is applied thereto by the press, the upper half 10 is carried in position on the studs but spaced from the lower half of the die by the springs 20 of the hinge and the springs 30 adjacent the front studs 26. When pressure is applied to the die in this position, the upper half will be guided for perfectly accurate vertical movement downwardly onto the lower half of the die by the guiding effect of the pins 26 sliding into the mounted bushings 24 in the upper half of the die.

Each half of the die is also provided with a center locating and clamping member 32 for the "stamper" or matrix, which is the disk from which the record impressions are made. When making a double sided phonograph record, a "stamper" will be laid on the upper and lower die faces with its center clamped by the clamping means 32 and its edge clamped by rings, later described. Each center clamping member comprises a disk, tapering to a thin section at its edge, carried by a stem 34 mounted in a bore 36, in which the stem has a close sliding fit, in the upper and lower halves of the die. Since the general arrangement of the clamping members 32 is identical, only one clamping member is described in detail and is illustrated in Fig. 4.

The working face of each die part is provided with a central depression conforming to the contour of the under surface of the clamping member head 32. The taper of the disk or head 32 of the clamping member is very slight, preferably about ten degrees, in order not to tear the center of the "stamper," which is of thin copper plate, in deforming the center of the stamper. The head 32 of the clamping member is drawn down on the die face 38 by means of studs 39 passing through a clamping plate 40 arranged in recesses in the center of the back of the top and bottom halves of the die and entering threaded bores in the stem. The center of the clamping piece is provided with a locating pin 44 for the circular label commonly placed in the center of each side of a double sided record. The locating pin of the upper die half is indicated at 44a.

The above described construction of center clamping member affords a valuable adjustability of the die to stampers of varying thickness since the careful fitting and use of shims to accommodate stampers of different thickness in molds or dies as at present constructed is avoided.

In order to facilitate the positioning of the labels, one of the pins shown in Fig. 4 as positioned in the clamping member in the lower die is arranged to project considerably above the surface of the clamping member and is mounted resiliently therein. The resilient mounting comprises a spring 46 arranged between the clamping plate 40 and a head 48 formed on the stem and arranged in a bore 50 in the stem of the clamping piece.

The upper end of the pin 44 is preferably provided with a conical depression to receive the conical end of the locating pin 44a carried by the upper die face.

It will be seen that no stress is placed on the mounting studs of the clamping members by the pressure to which the die is subjected since the plate 40 is free to move vertically to a slight degree in the recess in the top and/or bottom of the die.

In order to secure an even heating of the die, a heating coil 52 is cast in each of the die halves, which may be formed of "Kirksite" castings as before described. Each coil is arranged in a double layer, one coiling inwardly from its point of entry 54 into the die half toward the center and doubling back under the first layer and in vertical alignment with the coils thereof and in contact therewith until bent away to its point of outlet 56. This may be readily effected in manufacture by forming two coils, which may be of spiral configuration, exactly similar except at their outward ends, and connecting the inner ends by a return bend 58. The turns of the coils are spaced sufficiently apart to insure that vertical walls 60 of adequate strength are provided extending from the upper surface of the die to the lower surface or back in order to prevent any deflection of the working faces of the dies under the heavy loads to which they are subjected. The coil adjacent the faces of the upper and lower die halves are as close as practicable to the surface in order to secure a maximum transfer of heat to material in the die. The ends of the coils are provided with ferrules 62 having grooves formed therein in order to embed them securely in the body of the die. At the point of meeting between the coils and the outer wall of the die, ports are formed provided with a pipe thread adapted to receive any suitable form of readily attached connection enabling pipes containing heating or cooling medium to be attached to the coils.

The several ports are so arranged that the pipe fittings connected thereto do not interfere with the opening of the die or with its positioning in a press.

The medium is introduced through the coils adjacent the upper and lower working faces of the die and exhausted through the coils adjacent the backs of the upper and lower halves of the die. As the loss of heat in traversing the coil from inlet to outlet is uniform, this construction provides for equal heating throughout the working face of the die, since the hottest turn of the coils adjacent the working faces of the die will be overlying the coolest turn in the return portion of the coil, and so on through each turn of the coils.

In order to reduce the amount of metal required to be heated and cooled and to reduce cooling of the outer periphery of the working faces of the die due to radiation of heat outwardly through the side wall of the die, a deep groove or channel 64 is formed between the periphery of the die face and the outer wall of the die, this groove being interrupted only at points where sufficient metal is left to enclose the inlet and outlet portions of the coils.

Holding rings 66 are provided which serve to clamp the edges of the stamper disks on the working face or faces of the die and are of steel and of thick cross section. The rings are clamped in a recess 68 formed around the periphery of the die face and the top of the inner side wall of each die half. The rings 66 are clamped against the "stamper" by means of headed studs 70 passing through counterbores formed in the back of each half of the die and engaging in threaded bores in the clamping rings adjacent their inner edge. This construction affords a firm clamping action of the ring on the stamper while the thick body of the rings 66, which are of steel, serves to reinforce the peripheral edge of the die face and prevent deformation under the high stresses imposed thereon, and also affords a dead air space surrounding the working faces which is effective to reduce the loss of heat from the periphery of said face by radiation through the side of the die into the air. The clamping rings 66 engage against the stamper by means of an inwardly projecting flange 72, the thickness of which determines the thickness of the record. Since the "flash" or surplus material is extruded under high pressure between the flanges 72 of the upper and lower rings 66, I may coat the flanges with hard chromium plate to reduce wear. Since the flanges 72 may be brought into contact in the fully closed position I may provide relief passages if required in the upper surface of the rings, as indicated at 73 in Fig. 4.

It will be noted that the described construction provides a sturdy construction of die which may be readily opened on the raising of the ram of the press since the springs of the hinge and the springs associated with the front guide studs will have raised the upper half of the die away from the lower, a simple upward pull on the handle serving to open the die. The upper half of the die in fully open position rests firmly on the press platen by the engagement of the projections 16 in which the bushings for the rear guide pins are mounted, with the platen 74.

The formed record then may be lifted out of the die either by inserting a blade under the flash or by applying a suction cup to the record, and a fresh biscuit of plastic material placed in position on the stamper mounted on the lower die face, the upper half of the die lowered onto the lower half of the die and the ram of the press again lowered to form another record. It will be understood that if a single sided record is to be made the stamper in one half of the die would be a plain plate.

The invention has been described and illustrated in a preferred form, but it is to be understood that the scope of the invention is not in any way limited by this illustrative showing but only as indicated by the scope of the appended claims.

I claim:

1. A die member adapted for use with a companion die member to form a complete mold comprising a flat cast part having a working face, a circulating coil embedded in said part having an inlet and an outlet, said coil being arranged in two parts, one part being in the form of a spiral disposed in a plane adjacent the working face and the other part being in a spiral disposed in a plane further removed from said working face, the parts of said coil being connected by a return bend portion at their inner ends and having their individual convolutions laterally spaced and disposed in superposed contiguous relationship whereby wall portions of the cast material extend between the convolutions and serve to reinforce the working face of the die.

2. A die member adapted for use with a companion die member to form a complete mold comprising a flat cast part having a working face, said part having a peripheral channel of substantial depth surrounding said working face, a clamp ring adapted to be secured in said channel to provide radial support for the working face portion of the cast part and adapted to extend over the working face to a limited extent for securing a matrix thereto, said clamp ring being of lesser thickness than the depth of said channel whereby a dead air chamber is formed therein serving to reduce loss of heat from the periphery of the die, and a fluid circulating coil cast in said cast part.

3. In a die of the described, a die member having a working face adapted to receive a centrally apertured matrix, a matrix center clamping member mounted in said die member, said clamping member having a circular head with a plane upper surface and a stem depending from said head, the underside of the head of the clamping member being tapered toward its periphery to form a frusto-conical face disposed at a relatively slight angle to the working face of said die and extending from the stem to the periphery of the clamping member, the working face of the die being provided with a central bore to receive said stem and with a tapered face extending from the working face to said bore to receive said head and conforming in contour to that of the underside of said head whereby the inner edge portion of the matrix may be received between said surfaces substantially to said stem, and means for drawing said stem into said head to clamp the matrix center between the head and the tapered face portion of the working face of the die.

4. In a die of the type described, a die member having a working face adapted to receive a centrally apertured matrix, a matrix center clamping member mounted in said die member, said clamping member having a circular head with a plane upper surface and a stem depending from said head, the underside of the head of the clamping member being tapered toward its periphery to form a frusto-conical face disposed at a relatively slight angle to the working face of said die and extending from the stem to the periphery of the clamping member, the working face of the die being provided with a central bore to receive said stem and with a tapered face extending from the working face to said bore to receive said head and conforming in contour to that of the underside of said head, said die member having a counterbore surrounding said central bore extending toward the working face from the outer side of the die member, a plate in said counterbore, and means cooperating with said plate and said clamping member for drawing said clamping member into said bore and securing the same in clamping position.

ELBERT R. WADLEIGH.

REFERENCES CITED

The following references are of record in the file of this patent:

UNITED STATES PATENTS

| Number | Name | Date |
| --- | --- | --- |
| 1,308,475 | Burroughs | July 1, 1919 |
| 1,375,831 | Davis et al. | Apr. 26, 1921 |
| 1,417,463 | Edison et al. | May 23, 1922 |
| 1,447,183 | Roberts | Mar. 6, 1923 |
| 1,469,747 | Winter | Oct. 2, 1923 |
| 1,571,929 | Bronander | Feb. 9, 1926 |
| 1,705,975 | Holthaus | Mar. 19, 1929 |
| 1,847,573 | Rupp | Mar. 1, 1932 |
| 1,914,853 | Grange | June 20, 1933 |
| 2,046,372 | Engstrom | July 7, 1936 |
| 2,272,231 | Voth | Feb. 10, 1942 |